Aug. 4, 1953
H. H. WALKER ET AL
2,647,340
ARTIFICIAL BAIT
Filed Oct. 10, 1951
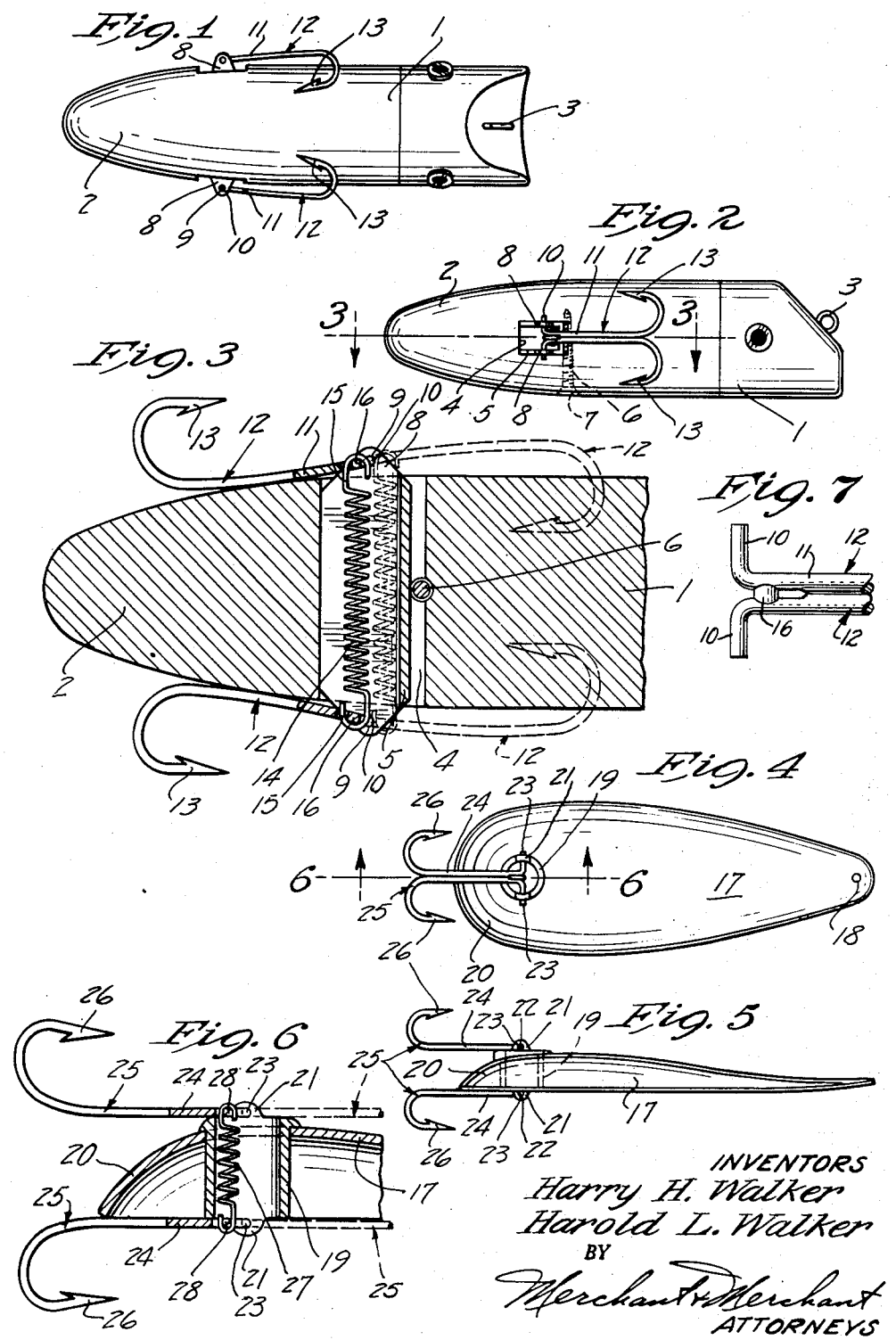
INVENTORS
Harry H. Walker
Harold L. Walker
BY
Merchant & Merchant
ATTORNEYS Patented Aug. 4, 1953

2,647,340

UNITED STATES PATENT OFFICE 2,647,340

ARTIFICIAL BAIT

Harry H. Walker and Harold L. Walker,
St. Paul, Minn.

Application October 10, 1951, Serial No. 250,694

5 Claims. (Cl. 43—42.41)

Our invention relates generally to fishing lures and, more particularly, to improvements therein designed to facilitate carrying and transportation of the same, and to prevent the hooks thereof from becoming entangled in clothing and the like during such movement.

More specifically, it is the object of our invention to provide a fishing lure in which the barbed ends of the hooks may be safely positioned against the body of the lure so as to allow the bait to be carried even in the pocket of a fisherman without fear of the same becoming entangled in the fabric of the pocket.

A still further object of our invention is the provision of a fishing lure having the above-described safety features without detracting from the efficiency or fish-catching potentialities thereof.

A still further object of our invention is the provision of a hook-equipped fishing lure which may be shipped in relatively large numbers without fear of the hooks thereof becoming enmeshed or entangled—thereby greatly reducing the cost of shipping, packing, and the like.

The above and still further objects of our invention will become apparent from the following detailed specification, appended claims, and attached drawings.

Referring to the drawings, wherein like characters indicate like parts throughout the several views:

Fig. 1 is a plan view of our novel structure;

Fig. 2 is a view in side elevation;

Fig. 3 is an enlarged fragmentary section taken substantially on the line 3—3 of Fig. 2;

Fig. 4 is a view in plan of a modified form of our invention;

Fig. 5 is a view in side elevation of the structure shown in Fig. 4;

Fig. 6 is an enlarged fragmentary view taken substantially on the line 6—6 of Fig. 4; and Fig. 7 is an enlarged fragmentary view in side elevation of one end of a hook element of our invention.

Referring with greater particularity to Figs. 1-3 inclusive of the drawings, the numeral 1 indicates an elongated body, preferably circular in cross section and having a tapered rear portion 2. A screw eye 3 on the forward end of the body 1 permits attachment thereto of a fish line. It will be noted that the body 1 is provided with a transversely-extended well or bore 4 which extends therethrough, preferably and as shown immediately forwardly of the tapered rear end portion 2. Received within the bore 4 is an elongated sleeve element 5 which is rigidly locked in place therein by means of a screw 6, the head 7 of which is flush with the surface of the body 1. The opposite ends of the sleeve 5 each terminate in a pair of laterally-spaced ears 8 which project laterally-outwardly of the bore 4 and body 1. Ears 8 are provided with aligned apertures 9, one each of which is adapted to pivotally receive an opposed trunnion 10 on the shank 11 of hook elements 12. The barbed ends of the hook elements 12 are identified by the numeral 13.

It will be noted that the pivotal connection between the trunnions 10 and the apertures 9 of the ears 8 permits swinging movements of the hook elements 12 from the operative full line position of Fig. 3 to the inoperative dotted line position thereof. The inoperative position of the hook elements 12 is likewise shown by Figs. 1 and 2. It will be noted that, in the operative position, the barbed ends 13 of the hook elements 12 project laterally-outwardly from the body 1 rearwardly of the bore 4, whereas said barbed ends 13 are in engagement with the body 1 forwardly of the bore 4 when the hook elements 12 are moved to their inoperative positions. Preferably and as shown, the hook elements 12 are of the type having two barbed ends 13 projecting in radially spaced relationship from a common shank 11.

A coil spring 14 received within the sleeve 5 has its opposite ends 15 hooked over cross pins 16 carried by the shanks 11 of the hook elements 12 in offset relationship to the pivoted trunnions 10. It will be noted that the spring 14 biases the hook elements 12 toward engagement with the body in operative or inoperative positions thereof. It will likewise be noted that spring 14 is of sufficiently small diameter to permit same to be laterally shifted from the full line to the dotted line positions of Fig. 3 without engagement of same with the walls of the sleeve 5 as the hooks 12 are swung from the operative full line to the inoperative dotted line positions of Fig. 3.

In the modified form of our invention illustrated in Figs. 4-6 inclusive, the elongated body 17 is of the spoon type, the line-receiving opening on the forward end thereof being identified by the numeral 18. In this form of invention, a tubular grommet 19 extends through the body 17, preferably and as shown, adjacent the rear end 20. It will be noted that the grommet 19 has a depth corresponding substantially to the depth of the spoon at the point of penetration. Opposite ends of the grommet 11 are formed to provide laterally-spaced ears 21 having aligned apertures 22 therein. Pivotally received within the apertures 21 are the trunnion-forming ends 23 of the shanks 24 of hook elements 25. The barbed ends of the hook elements 25 are identified by the numeral 26. A coil spring 27 is received within the grommet 19 with its opposite ends hooked over cross pins 28 on the shanks 24 in slightly offset relation to trunnions 23 thereof. It will be noted that the spring 27 is sufficiently loosely received within the grommet 19 to permit same to be shifted laterally as the hook elements 25 are moved from the operative full line position of Fig. 6 to the inoperative dotted line position thereof.

While we have illustrated a preferred and one modified form of our invention, it is obvious that the same is capable of still further modification without departure from the spirit and scope of the invention as defined by the appended claims.

What we claim is:

1. A fishing lure comprising a body having therein a transversely-extended bore intermediate its ends, a hook element including a shank and a barbed end, means pivotally mounting the shank of said hook element over said bore for swinging movements of the barbed end thereof from an operative position wherein said barbed end extends laterally-outwardly of said body rearwardly of said bore to an inoperative position wherein the barbed end is in engagement with said body forwardly of said bore, and a coil spring in said bore, said coil spring having one end anchored to said shank in offset relation to the pivotal connection thereof, said spring biasing said hook element toward engagement with said body in either of said positions.

2. A fishing lure comprising an elongated body having a transversely-extended bore through its intermediate portion, a pair of hook elements each including shanks and barbed ends, means pivotally mounting the shanks of said hook elements one each over opposite ends of said bore for swinging movements of the barbed ends thereof from operative positions wherein said barbed ends extend laterally-outwardly of said body rearwardly of said bore to inoperative positions wherein the barbed ends are in engagement with said body forwardly of said bore, and a coil spring extending loosely through said bore, opposite ends of said coil spring being anchored one each to one of said shanks in offset relation to their pivotal connections, said spring permitting swinging movements of said hook elements from operative to inoperative positions and biasing said hook elements toward engagement with said body in either of said positions.

3. The structure defined in claim 1 in which the means pivotally mounting the shank of said hook element over the mouth of said bore includes an axially-extended sleeve within said bore, said sleeve terminating in laterally-spaced ears which project laterally-outwardly from said bore, said ears having aligned apertures therein, and opposed trunnions on the shank of said hook element receivable one each within one of said aligned openings.

4. The structure defined in claim 2 in which the means pivotally mounting the shanks of said hook elements includes an axially-extended sleeve within said bore, said sleeve terminating in a pair of laterally-spaced ears at its opposite ends which ears project laterally-outwardly from said bore and body, each pair of said ears having aligned apertures therein, and opposed trunnions on the shanks of said hook elements receivable one each within one of said aligned openings, and in further combination with means for locking said sleeve within said bore.

5. A fishing lure comprising a body, a hook element including a shank and a barb-equipped end pivotally secured to the side of the body for substantially 180° degrees of pivotal movement of the free barb-equipped end thereof from an operative rearwardly extended position wherein the hook element projects laterally outwardly from the body to an inoperative forwardly extended position wherein the barbed end is in engagement with the body, and yielding means biasing said hook element toward the limit of its movement to operative or inoperative position.

HARRY H. WALKER.
HAROLD L. WALKER.

References Cited in the file of this patent

UNITED STATES PATENTS

| Number | Name | Date |
|--------|------|------|
| 619,209 | Stanek | Dec. 20, 1898 |
| 834,967 | Carlson et al. | Nov. 6, 1906 |
| 1,232,804 | Jamison | July 10, 1917 |
| 1,486,028 | Meighen | Mar. 4, 1924 |
| 2,013,285 | Mopney | Sept. 3, 1935 |
| 2,036,075 | Peterson | Mar. 31, 1936 |
| 2,500,477 | Walker | Mar. 14, 1950 |